United States Patent [19]

Takahashi et al.

[11] Patent Number: 5,341,317

[45] Date of Patent: Aug. 23, 1994

[54] CURVILINEAR APPROXIMATION METHOD

[75] Inventors: Shingo Takahashi; Aisaku Imanishi, both of Tokyo, Japan

[73] Assignee: Seikosha Co., Ltd., Tokyo, Japan

[21] Appl. No.: 998,892

[22] Filed: Dec. 29, 1992

Related U.S. Application Data

[63] Continuation of Ser. No. 775,659, Oct. 10, 1991.

[30] Foreign Application Priority Data

Oct. 17, 1990 [JP] Japan .................................. 2-278100

[51] Int. Cl.⁵ .............................................. G06F 7/38
[52] U.S. Cl. .................................................. 364/720
[58] Field of Search ................ 364/718, 720, 721, 723

[56] References Cited

U.S. PATENT DOCUMENTS

| | | | |
|---|---|---|---|
| 4,620,287 | 10/1986 | Yam .................................. | 364/728 X |
| 4,835,722 | 5/1989 | Clarke et al. ...................... | 364/720 |
| 4,853,885 | 8/1989 | Naoi et al. ......................... | 364/718 |

FOREIGN PATENT DOCUMENTS

| | | |
|---|---|---|
| 3700740 | 7/1987 | Fed. Rep. of Germany . |
| 2185606 | 7/1987 | United Kingdom . |

*Primary Examiner*—Jerry Smith
*Assistant Examiner*—Chuong D. Ngo
*Attorney, Agent, or Firm*—Jordan and Hamburg

[57] ABSTRACT

A method for approximately representing a first curve having anchor points and a control point, wherein the first curve is subdivided into a plurality of segments and an approximate curve is constructed by joining the points corresponding to the ends of the segments with straight lines. The number of segments is determined by sequentially subdividing the first curve until sum of the lengths of lines joining the anchor points and control points is less than a predetermined value.

3 Claims, 11 Drawing Sheets

FIG.5

| n | t | WA | WB | WC | WD |
|---|---|---|---|---|---|
| 0 | 0/256 | WA0 | WB0 | WC0 | WD0 |
| 1 | 1/256 | WA1 | WB1 | WC1 | WD1 |
| 2 | 2/256 | WA2 | WB2 | WC2 | WD2 |
| . | . | . | . | . | . |
| . | . | . | . | . | . |
| . | . | . | . | . | . |
| . | . | . | . | . | . |
| 255 | 255/256 | WA255 | WB255 | WC255 | WD255 |
| 256 | 256/256 | WA256 | WB256 | WC256 | WD256 |

FIG.6

| Address | Data |
|---------|------|
| 0 0 0 0 | W A 0 |
| 0 0 0 1 | W A 1 |
| . | . |
| . | . |
| 0 2 5 6 | W A 256 |
| 0 2 5 7 | W B 0 |
| 0 2 5 8 | W B 1 |
| . | . |
| . | . |
| 0 5 1 3 | W B 256 |
| 0 5 1 4 | W C 0 |
| 0 5 1 5 | W C 1 |
| . | . |
| . | . |
| 0 7 7 0 | W C 256 |
| 0 7 7 1 | W D 0 |
| 0 7 7 2 | W D 1 |
| . | . |
| . | . |
| 1 0 2 7 | W D 256 |

FIG. 7

| Address | Data |
|---|---|
| 0 0 0 0 | P A X 0 |
| 0 0 0 1 | P B X 0 |
| 0 0 0 2 | P C X 0 |
| 0 0 0 3 | P D X 0 |
| 0 0 0 4 | P A Y 0 |
| 0 0 0 5 | P B Y 0 |
| 0 0 0 6 | P C Y 0 |
| 0 0 0 7 | P D Y 0 |
| 0 0 0 8 | P A X 1 |
| 0 0 0 9 | P B X 1 |
| 0 0 1 0 | P C X 1 |
| 0 0 1 1 | P D X 1 |
| 0 0 1 2 | P A Y 1 |
| 0 0 1 3 | P B Y 1 |
| 0 0 1 4 | P C Y 1 |
| 0 0 1 5 | P D Y 1 |
| 0 0 1 6 | P A X 2 |
| ⋮ | ⋮ |

FIG. 8

| Address | Data |
|---------|------|
| 0 0 0 0 | $\Delta n1$ |
| 0 0 0 1 | $\Delta n2$ |
| 0 0 0 2 | $\Delta n3$ |
| 0 0 0 3 | $\Delta n4$ |
| · | · |
| · | · |
| · | · |

FIG.9

| Address | Data |
|---------|------|
| 0 0 0 0 | X 0,0 |
| 0 0 0 1 | Y 0,0 |
| 0 0 0 2 | X 0,1 |
| 0 0 0 3 | Y 0,1 |
| ⋮ | ⋮ |
| 0 0 3 1 | X 0,16 |
| 0 0 3 2 | Y 0,16 |
| 0 0 3 3 | X 1,0 |
| 0 0 3 4 | Y 1,0 |
| 0 0 3 5 | X 1,1 |
| 0 0 3 6 | Y 1,1 |
| ⋮ | ⋮ |
| 0 0 9 6 | X 1,32 |
| 0 0 9 7 | Y 1,32 |
| 0 0 9 8 | X 2,0 |
| 0 0 9 9 | Y 2,0 |
| ⋮ | ⋮ |

CURVILINEAR APPROXIMATION METHOD

RELATED APPLICATIONS

This application is a continuation of application Ser. No. 07/775,659, filed Oct. 10, 1991 and now abandoned.

This application is related to co-pending U.S. patent application Ser. No. 07/775,651 and Ser. No. 07/775,660, both having the same common inventors as this instant application, both being filed concurrently herewith, the disclosures of both being incorporated herein by reference.

FIELD OF THE INVENTION

The present invention relates to a curvilinear approximation method for an outline font.

BACKGROUND OF THE INVENTION

In recent years, outline fonts have been increasingly used for expressing curves of a character or graph.

In the actual depiction of a curve using outline font in the prior art, the curve is sequentially subdivided until adjacent subdividing points are degenerated at the same point. The curve is approximately expressed by sequentially connecting the respective subdividing points with straight lines.

If a curvature of a curve to be expressed is small, it is possible to provide a sufficient quality of expression even though the number of subdivisions is not so increased.

In the conventional methods, however, the subdivisions are effected irrespective of the curvature. More subdivisions than required will be performed in some cases. This results in the problem that generation of an outline font requires a large amount of time.

SUMMARY OF THE INVENTION

Accordingly, it is an object of this invention to reduce the time needed for generating an outline font while obtaining the optimum number of subdivisions in accordance with a curve to be expressed.

According to the present invention, a curvilinear approximation method is provided for approximately expressing a curve expressed by two anchor points and at least one control point, comprising the steps of subdividing the curve into a plurality of parts, and connecting adjacent subdividing points with a straight line. The method of this invention comprises sequentially subdividing the curve into two subdivided curves, obtaining the difference between the length of the total line segment when respectively connecting points of both ends of the one subdivided curve to a point other than the points of both ends of the one subdivided curve with straight lines and the length of the line segment when connecting the points of both ends thereof with a straight line, and obtaining the number of subdivisions of the curve on the basis of the number of subdividing operations until the difference becomes smaller than a predetermined value.

BRIEF DESCRIPTION OF THE DRAWINGS

FIG. 5 is a conceptual diagram of a data table;

FIGS. 6 to 9 are address maps of respective data stored in RAMs; and

DESCRIPTION OF THE PREFERRED EMBODIMENTS

Figure 1:
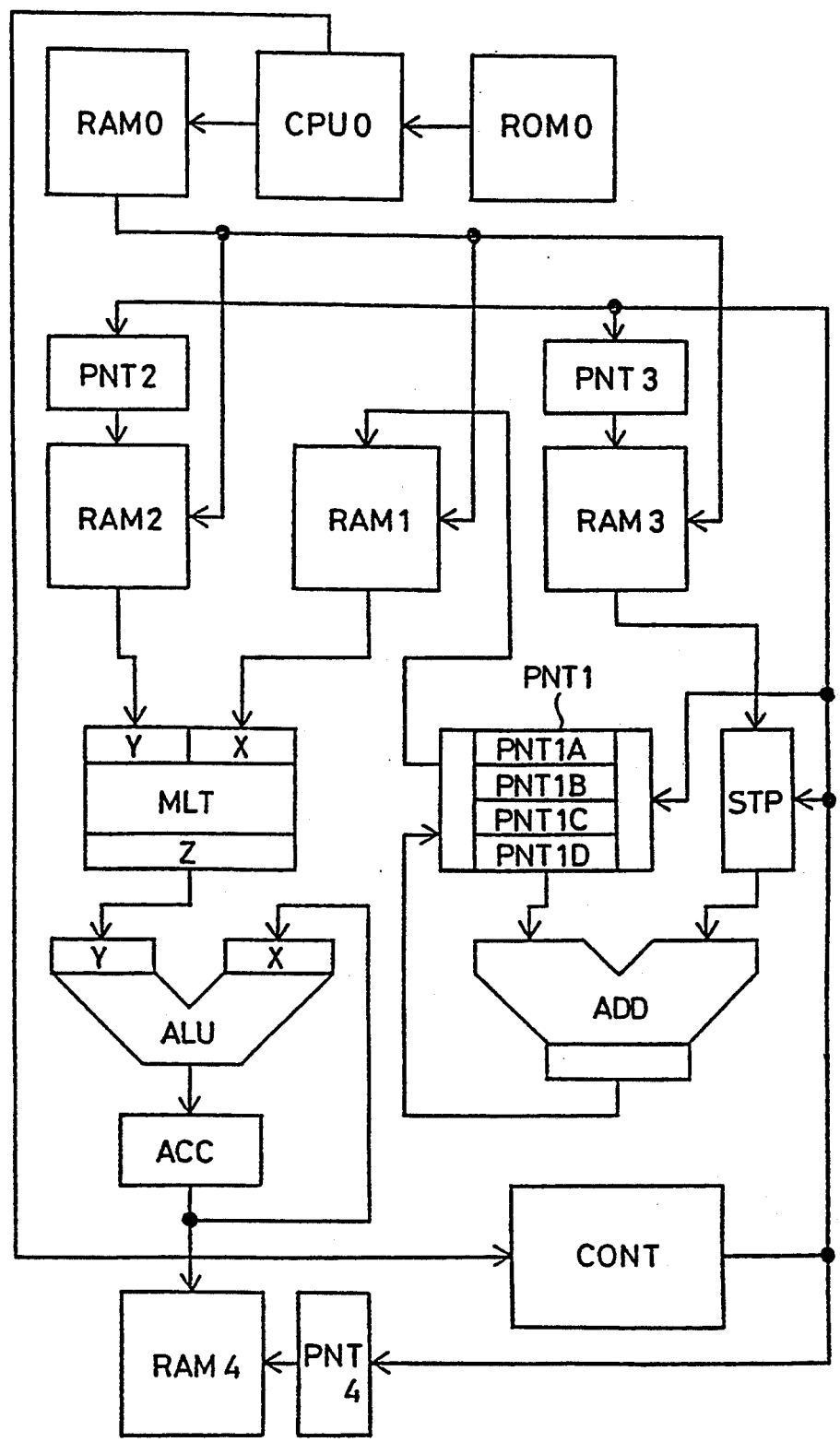
FIG. 1 is a block diagram.

An embodiment of the present invention will hereinafter be described with reference to the accompanying drawings.

In the following embodiment, so far as the conditions are not particularly prescribed, a cubic curve such as a cubic Bezier curve and a cubic Spline curve is used for expressing an outline font. These curves are parametrically expressed as follows:

$$Q = WA \times PA + WB \times PB + WC \times PC + WD \times PD \quad \ldots \quad (1)$$

where WA, WB, WC and WD are the functions expressed by using a parameter "t". Take the cubic Bezier curve for example, these functions are given by:

$$WA = (1-t)^3 \tag{2a}$$

$$WB = 3t \cdot (1-t)^2 \tag{2b}$$

$$WC = 3t^2 \cdot (1-t) \tag{2c}$$

$$WD = = t^3 \tag{2d}$$

$$(0 \leq t \leq 1)$$

PA, PB, PC and PD are the coordinates on an X-Y plane which determine a curvilinear configuration. These coordinates are expressed such as:

| | |
|---|---|
| PA (x, y): | anchor point |
| PB (x, y): | control point |
| PC (x, y): | control point |
| PD (x, y): | anchor point |

Now, considering the formula (1), the parameter functions WA, WB, WC and WD are, as expressed in, e.g., the formulae (2a) through (2d), uniquely determined depending on types of the cubic curves. PA, PB, PC and PD are predetermined in accordance with the curvilinear configuration. Hence, as shown in FIG. 5, the parameter functions WA to WD are precalculated corresponding to values of the respective subdivided parameters "t". Results of the calculations can be stored in a data table. The coordinates (x, y) of PA, PB, PC and PD are also storable in the data table. The respective data are thus stored in the data table. Hardware calculations based on the formula (1) are effected using a multiplier and an adder, thereby enabling generating the curvilinear data at a high speed. More specifically, as shown in FIG. 5, the parameter "t" ($0 \leq t \leq 1$) is subdivided by 256. The parameter functions WA through WD are obtained per "t". Then, the hardware calculations based on the formula (1) are carried out. As a result, the coordinates at totally 257 points on the curve can be obtained. These coordinates are sequentially connected with straight lines, whereby the curve can approximately be expressed.

In the example given above, the curve is approximately expressed by subdividing the curve by 256. In the case of a curve having a small curvature, an approximate curve exhibiting a sufficient accuracy is expressible even if the curve does not undergo such a large number of subdivisions. This will be explained with reference to FIGS. 3, 4(A) and 4(B). The curve depicted in FIG. 3 consists of totally 14 segmental curves C1 through C14. Each of the segmental curves C1 through C14 is expressed by the formula (1), using different anchor and control points. FIGS. 4(A) and 4(B) respectively show the segmental curves C1 and C2 of FIG. 3. The segmental curve C1 is, as illustrated in FIG. 4(A), subdivided by 16. The segmental curve C1 is approximately expressed by 17 points $Q0,0$ to $Q0,16$ provided thereon. In an example of FIG. 5, n is incremented stepwise by sixteens (256/16=16) such as n=0, 16, 32..., 256. The calculations may be effected on only these values of n. The segmental curve C2 is, as illustrated in FIG. 4(B), subdivided by 32. The segmental curve C2 is approximately expressed by 33 points $Q0,0$ to $Q0,32$ provided thereon. In the example of FIG. 5, n is incremented stepwise by eights (256/32=8) such as n=0, 8, 16, ..., 256. The calculations may be effected on only these values of n. In this manner, a proper number of divisions is previously obtained corresponding to the curves. Only the calculations corresponding thereto are carried out, resulting in a speed-up of the hardware calculations. A specific method for obtaining the number of subdivisions will be discussed later.

Referring to the above-mentioned, the curvilinear approximate method shown in FIG. 3 will hereinafter be explained.

Figure 3:
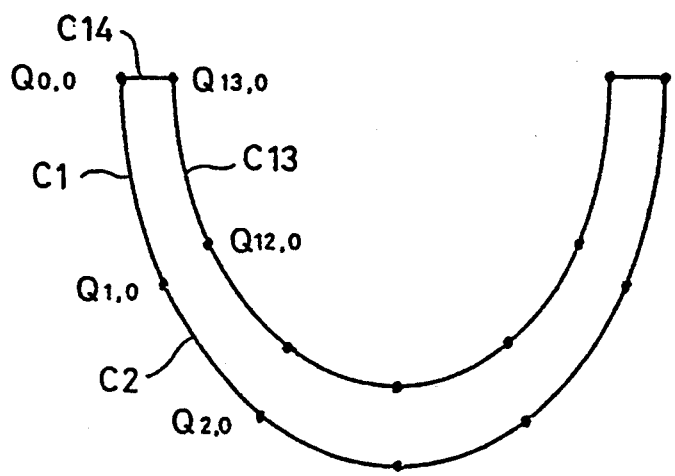
FIGS. 3, 4 (A) and 4 (B) are diagrams to aid in the explanation of an outline font.
Figures 4A, 4B:
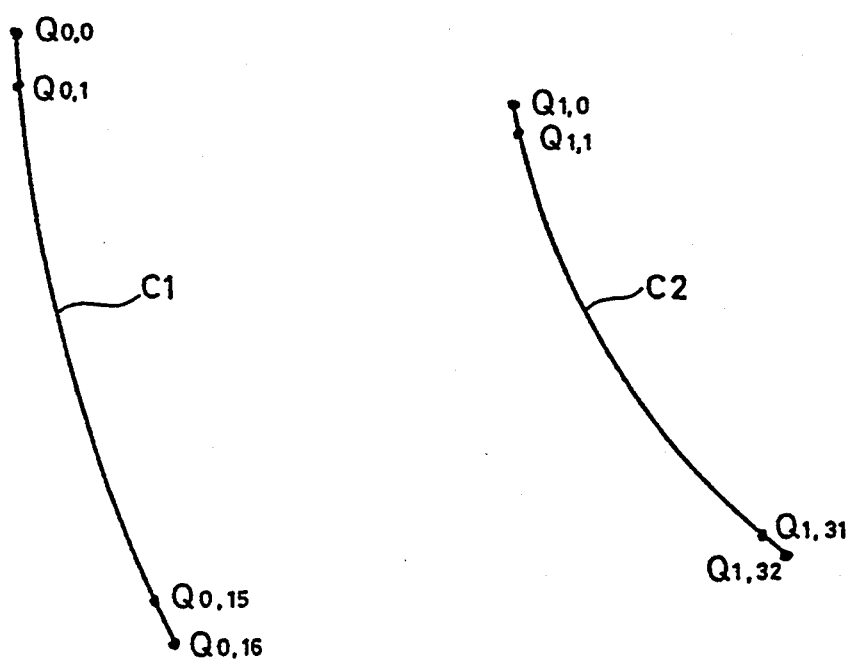

FIG. 1 is a block diagram showing hardware employed for approximately expressing the curve of FIG. 3.

A microprocessor CPU0 controls the hardware as a whole.

A read-only memory ROM0 stores programs used for a variety of processes performed by the microprocessor CPU0.

A random access memory RAM0 prestores the data which will be discussed later. Stored in RAM0 are data on a variety of curves such as the cubic Spline curve in addition to the cubic Bezier curve. The data are, as the necessity arises, transferred to RAM1, RAM2 and RAM3 which will hereinafter be described.

A random access memory RAM1 stores the values of the parameter functions WA, WB, WC and WD shown in FIG. 5. Stored in RAM1 in the manner shown in FIG. 6 are data WA0-WA256, WB0-WB256, WC0-WC256 and WD0-WD256 which are transmitted from RAM0.

A random access memory RAM2 stores coordinate data of the anchor points PA, PD and the control points PB, PC for each of the segmental curves C1–C14 shown in FIG. 3. The coordinate data are transferred from RAM0 and stored, as illustrated in FIG. 7, in RAM2. Referring to FIG. 7, PAX0-PDX0 represent x-coordinates at the anchor and control points on the segmental curve C1. PAY0-PDY0 indicate y-coordinates at the anchor and control point. PAX1-PDX1 designate x-coordinates at the anchor and control points on the segmental curve C2. PAY1-PDY1 are y-coordinates at the anchor and control points.

For each of the segmental curves C1–C14, a random access memory RAM3 prestores the data corresponding to the number of subdivisions of the individual segmental curves C1–C14 shown in FIG. 3 The data corresponding to the number of subdivisions may include the subdividing number itself or the step-number n shown in FIG. 5. In this embodiment, the random access memory RAM3 stores, as illustrated in FIG. 8, the step-number n, i.e., an n-increment n. Referring to FIG. 8, $\Delta n1$, $\Delta n2$, ... represent the step-numbers stored corresponding to the segmental curves C1, C2, ... of FIG. 3. Data $\Delta n1$, $\Delta n2$, ... are transferred from RAM0 and stored, as illustrated in FIG. 8, in RAM3.

A random access memory RAM4 stores results of the hardware calculations effected in accordance with the formula (1), viz., data Q (x, y) about the coordinates on the segmental curves C1–C14. The coordinate data Q (x, y) are, as depicted in FIG. 9, stored in RAM4. Referring to FIG. 9, data $X0,0$-$X0,16$ and $Y0,0$-$Y0,16$ are x- and y-coordinates at points $Q0,0$-$Q0,16$ on the segmental curve C1 of FIG. 4(A). Data $X1,0$-$X1,32$ and $Y1,0$-$Y1,32$ are x- and y-coordinates at points $Q1,0$-$Q1,32$ on the segmental curve C2 of FIG. 4 (B).

An address pointer PNT1 of RAM1 is composed of independent address sub-pointers PNT1A, PTN1B, PNT1C and PNT1D. The sub-pointers PNT1A, PNT1B, PNT1C and PNT1D point to addresses of the data WA0-WA256, WB0-WB256, WC0-WC256 and WD0-WD256 (see FIG. 6) respectively.

An address pointer PNT2 of RAM2 is intended to point to addresses of the respective coordinate data (see FIG. 7) at the anchor and control points, the data being stored in RAM2.

An address pointer PNT3 of RAM3 serves to point to addresses of the step-numbers $\Delta n1$, $\Delta n2$ ... (see FIG. 8) which are stored in RAM3.

An address pointer PNT4 of RAM4 points to addresses of coordinate data $X0,0$-$X0,16$ and $Y0,0$-$Y0,16$ (see FIG. 9) which are obtained by the hardware calculations.

A latch circuit STP acts to latch the step-numbers $\Delta n2$, ... (see FIG. 8) which are stored in RAM3.

An adder circuit ADD adds a value of the address subpointer (PNT1A, PNT1B, PNT1C or PNT1D) that is now being selected to a value of the latch circuit STP. The adder circuit ADD sends the result of this addition to the address sub-pointer that is now being selected. To be specific, the adder circuit ADD increments the values of the address sub-pointers by the step-numbers $\Delta nl$, $\Delta n2$, ... which are being latched by the latch circuit STP.

A multiplier circuit MLT multiplies the data stored in RAM1 shown in FIG. 6 by the data stored in RAM2 of FIG. 7. That is, the circuit MLT performs the multiplication (e.g., WA×PA) in the formula (1).

An arithmetic logical circuit ALU adds the multiplied value given by the multiplier circuit MLT to a value in an accumulator which will be stated later.

The accumulator ACC holds the arithmetic result of the arithmetic logical circuit ALU and transmits it to one input of this circuit ALU. Namely, the arithmetic logical circuit ALU and the accumulator ACC cooperate to perform the addition in the formula (1).

A control circuit CONT controls the arithmetic process upon receiving a command from the microprocessor CPU0. The control circuit CONT incorporates a microprogram relative to the above-described arithmetic processes.

Referring to flowcharts of FIGS. 2(A), 2(B) and 2(C), an operation of the circuit depicted in FIG. 1 will be explained.

Initialization is at first effected on the basis of a signal from the microprocessor CPU0.

(a): Transmitted from RAM0 to RAM1 are the data corresponding to the respective "t" of the parameter functions WA, WB, WC and WD shown in FIG. 5. The data are, as shown in FIG. 6, stored in RAM1. Transmitted from RAM0 to RAM2 are the data of coordinates at the anchor and control points for each of the segmental curves C1–C14 of FIG. 3. The coordinate data are then, as shown in FIG. 7, stored in RAM2. Transmitted from RAM0 to RAM3 are the step-number data Δn1, Δn2, . . . for each of the segmental curves C1–C14 corresponding to the number of subdivisions of the respective segmental curves C1–C14 shown in FIG. 3. The step-number data are, as shown in FIG. 8, stored in RAM3.

(b): The address pointers PNT2, PNT3 and PNT4 are set respectively to "0". As a result, the addresses in which the data PAX0 of FIG. 7, the data Δn1 of FIG. 8 and the data X0,0 of FIG. 9 are stored, are pointed to.

The initialization has thus come to an end. Next, the arithmetic operation for the segmental curve C1 depicted in FIGS. 3 and 4(A) is executed.

(c): "0" is set to the address sub-pointer PNT1A. "257" is set to the address sub-pointer PNT1B. "514" is set to the address sub-pointer PNT1C. "771" is set to the address sub-pointer PNT1D. As illustrated in FIG. 6, the addresses in which the data WA0, WB0, WC0 and WD0 are stored are pointed to. Latched by the latch circuit STP is data M [PNT3] stored in an address "0000" of RAM3, the address being pointed by the address pointer PNT3. Latched is the step-number n1 (the step-number "16" corresponding to the number of subdivisions of the segmental curve C1 of FIG. 4(A)) shown in FIG. 8.

(d): The following is a way of performing the calculation routine shown in FIG. 2(B).

To obtain the x-coordinates at the point Q0,0 shown in FIG. 4 (A), "WA×PA+WB×PB+WC×PC+WD×PD" in the formula (1) is performed in the following manner.

(d1): The accumulator ACC is cleared, and "0" is set.

(d2): Transferred to an input "X" of the multiplier circuit MLT is data M [PNT1A], i.e., "WA0" (see FIG. 6) stored in an address "0000" of RAM1, this address being pointed by the address sub-pointer PNT1A. Transferred to an input "Y" of the multiplier circuit MLT is data M [PNT2], viz., "PAX0" (see FIG. 7) stored in the address "0000" of RAM2, this address being pointed by the address pointer PNT2.

(d3): The multiplication and addition of FIG. 2(C) are carried out as follows.

(d101): Outputted to "Z" of the multiplier circuit MLT is the product, given by "WA0×PAX0" of the value "WA0" of the input "X" of the multiplier circuit MLT and the value "PAX0" of the input "Y" thereof. That is, the calculation corresponding to "WA×PA" in the formula (1) is effected. The result of this calculation is sent to an input "Y" of the arithmetic logical circuit ALU. On the other hand, the data "0" of the accumulator ACC is transferred to an input "X" of the arithmetic logical circuit ALU.

(d102): The value of the input "X" of the arithmetic logical circuit ALU is added to the value of the input "Y" thereof. The result of this addition is sent to the accumulator ACC. As a result, the value given by "WA0 X PAX0" is held in the accumulator ACC.

(d103): "1" is added to the value of the address pointer PNT2, whereby the pointer value becomes "0001".

(d4): Transferred to the input "X" of the multiplier circuit MLT is data M [PNT1B], i.e., "WB0" (see FIG. 6) stored in an address "0257" of RAM1, this address being pointed by the address sub-pointer PNT1B. Transferred to the input "Y" of the multiplier circuit MLT is data M [PNT2], viz., "PBX0" (see FIG. 7) stored in an address "0001" of RAM2, this address being pointed by the address pointer PNT2.

(d5): The multiplication and addition of FIG. 2(C) are performed. The fundamental operations are the same as those described in the item (d3). The multiplier circuit MLT obtains the product of "WB0" shown in FIG. 6 and "PBX0" shown in FIG. 7, the product being given by "WB0×PBX0" corresponding to "WB×PB" shown in the formula (1). The arithmetic logical circuit ALU adds a value of "WB0×PBX0" to the value held in the accumulator ACC, of "WA0×PAX0". Held in the accumulator ACC is the result of the calculation such as "WA0×PAX0+WB0×PBX0". Namely, the calculation corresponding to "WA×PA+WB×PB" in the formula (1) is performed.

(d6): Transferred to the input "X" of the multiplier circuit MLT is data M [PNT1C], i.e., "WC0" (see FIG. 6) stored in an address "0514" of RAM1, this address being pointed by the address sub-pointer PNT1C. Transferred to the input "Y" of the multiplier circuit MLT is data M [PNT2], i.e., "PCX0" (see FIG. 7) stored in an address "0002" of RAM2, this address being pointed by the address pointer PNT2.

(d7): The multiplication and addition of FIG. 2(C) are carried out. The fundamental operations are the same as those explained in (d3). The multiplier circuit MLT obtains the product of "WC0" shown in FIG. 6 and "PCX0" shown in FIG. 7, this product being given by "WC0×PCX0" corresponding to "WC×PC" in the formula (1). The arithmetic logical circuit ALU adds the result of this calculation of "WC0×PCX0" to the value, held in the accumulator ACC, of "WA0×PAX0+WB0 ×PBX0". Held in the accumulator ACC is the result of this calculation: "WA0×PAX0+WB0×PBX0+WC0×PCX0". That is, there is herein effected the calculation corresponding to "WA×PA+WB×PB+WC×PC" in the formula (1).

(d8): Transferred to the input "X" of the multiplier circuit MLT is data M [PNT1D], viz., "WD0" (see FIG. 6) stored in an address "0771" of RAM1, this address being pointed by the address sub-pointer PNT1D. Transferred to the input "Y" of the multiplier circuit MLT is data M [PNT2], i.e., "PDX0" (see FIG. 7) stored in an address "0003" of RAM2, this address being pointed by the address pointer PNT2.

(d9): The multiplication and addition of FIG. 2(C) are effected. The fundamental operations are the same as those described in the item (d3). The multiplier circuit MLT obtains the product of "WD0" shown in FIG. 6 and "PDX0" shown in FIG. 7, this product being given by "WD0×PDX0" corresponding to "WD×PD" in the formula (1). The arithmetic logical circuit ALU adds the result of this calculation of "WD0×PDX0" to the value held in the accumulator ACC, of "WA0×PAX0+WB0×PBX0+WC0×PCX0". Held in accumulator ACC is the result of this calculation: "WA0×PAX0+WB0×PBX0+WC0×PCX+WD0×PDX0". Namely, the calculation corresponding to "WA×PA+WB×PB+WC×PC+WD×PD" is performed.

(d10): The x-coordinates at the point Q0,0 shown in FIG. 4(A) are calculated in the manner discussed above. The calculation results held in the accumulator ACC are stored in the address "0000" of RAM4 which is pointed by the address pointer PNT4. The stored data M [PNT4] is expressed as "X0,0" in FIG. 9.

(d11): "1" is added to the value of the address pointer PNT4, whereby the pointer value becomes "0001".

(d12)-(d21): Next, for obtaining y-coordinates at the point Q0,O shown in FIG. 4(A), as in the manner of (d1) through (d10), the processes of (d12)-(d21) shown in FIG. 2(B) are carried out. Stored in the address "0001" of RAM4 that is pointed by the address pointer PNT4 is the arithmetic result obtained by "WA0×PAY0+WB0×PBY0+WC0×PCY0+WD0×PDY0". The thus stored data M [PNT4] is expressed as "Y0,0" in FIG. 9.

(d22): "1" is added to the value of the address pointer PNT4, as a result of which the pointer value becomes "0002".

(d23): "8" is subtracted from the value of the address pointer PNT2, whereby the pointer value becomes "0000".

Figure 2:
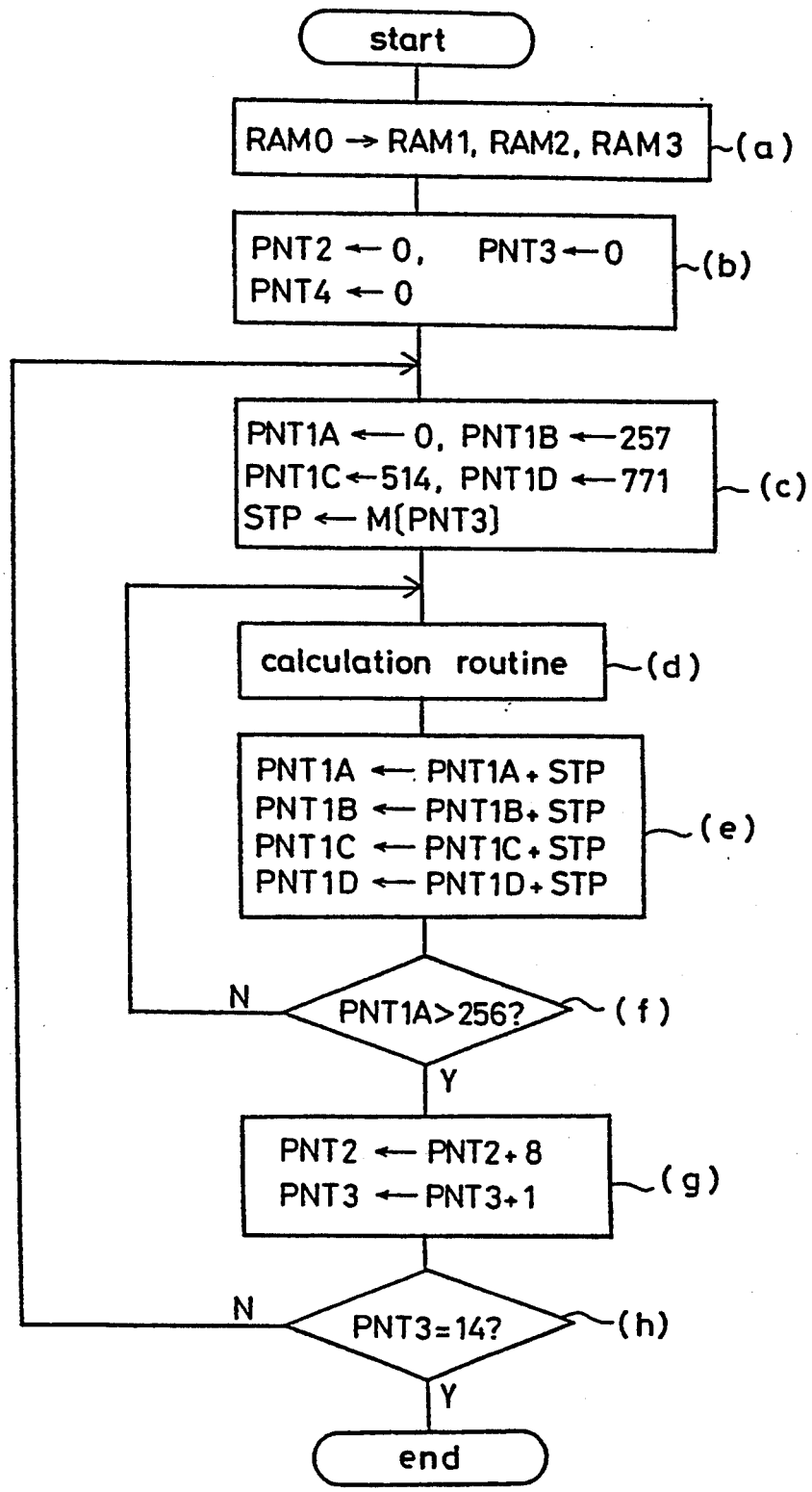
FIG. 2(A), 2(B) and 2(C) are flowcharts showing operations relative to FIG. 1.
Figure 2:
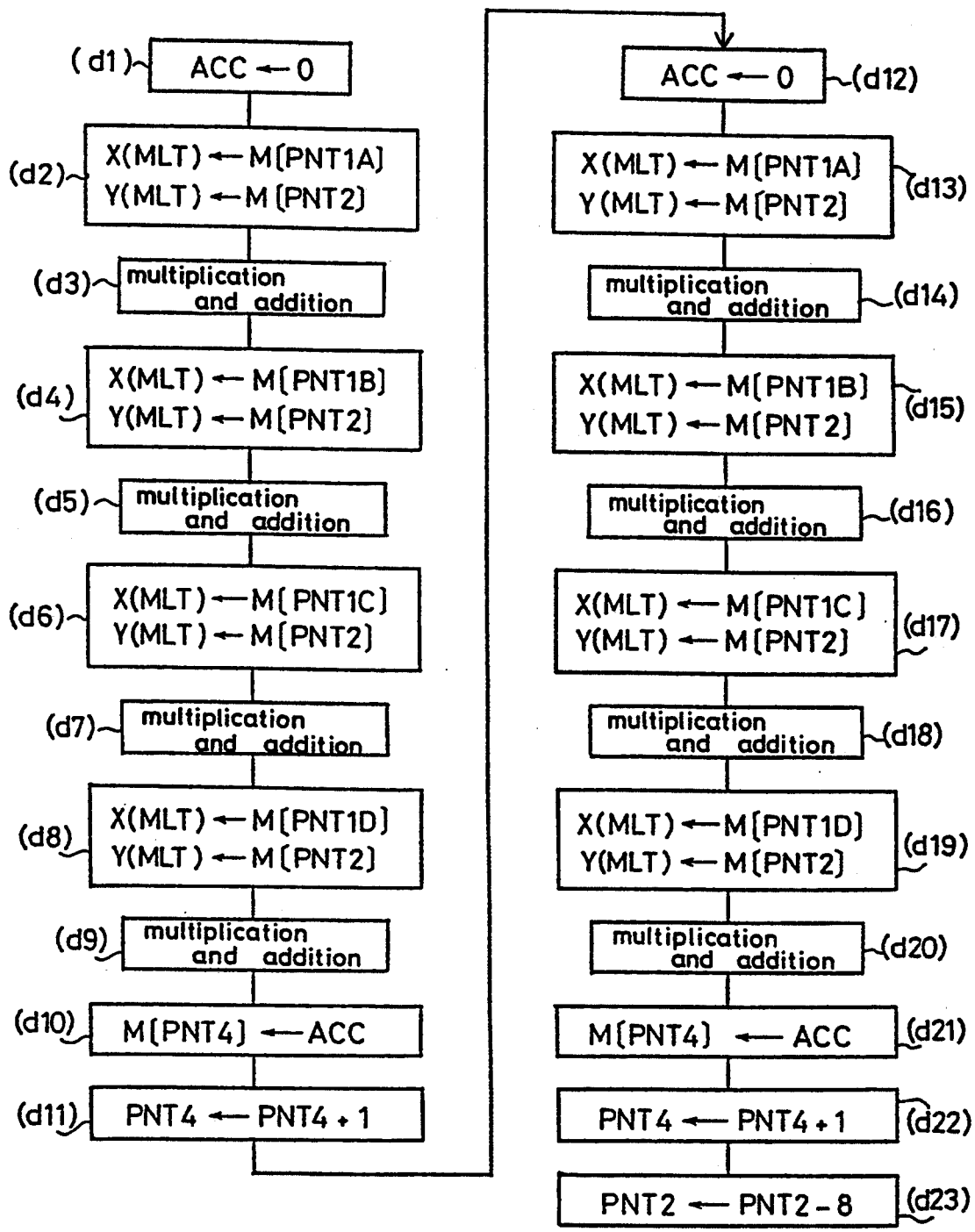
Figure 2:
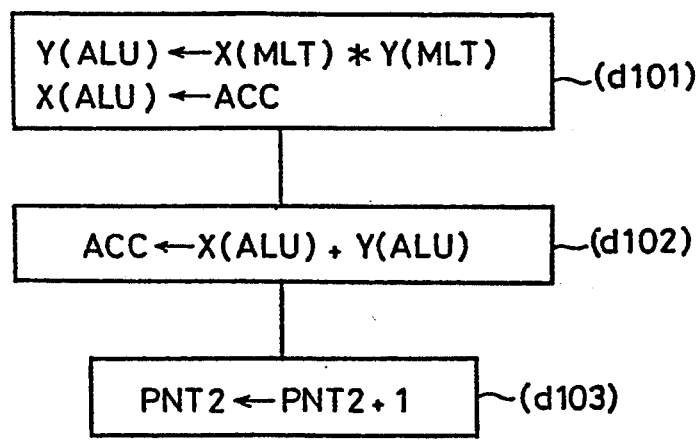

The calculation routine shown in FIG. 2(A) is thus finished. The x-coordinates "X0,0" and y-coordinates "Y0,0" at the point Q0,0 of FIG. 4(A) are stored in RAM4 (See FIG. 9).

(e): Added to each of the values of the address sub-pointers PNT1A, PNT1B, PNT1C and PNT1D is the step-number Δn1 (the step-number "16" corresponding to the number subdivisions of the segmental curve C1 of FIG. 4(A)), this step-number being latched by the latch circuit STP. The pointer values of the address sub-pointers PNT1A, PNT1B, PNT1C and PNT1D are "16", "273" (257+16), "530" (514+16), "787" (771+16), respectively.

(f): Whether or not the value of the address sub-pointer PNT1A is larger than "256" is determined.

The present value of the address sub-pointer PNT1A is "0016". Therefore, the process moves to a calculation routine (d). The same process as that explained in the item (d) is carried out. Consequently, the x-coordinates "X0,1" and y-coordinates "Y0,1" at the point Q0,1 of FIG. 4(A) are stored in RAM4 (see FIG. 9). As the specific data "X0,1" is "WA16×PAX0+WB16×PBX0+WC16×PCX0+WD16×PDX0". "Y0,1" is "WA16×PAY0+WB16×PBY0+WC16×PCY0+WD16×PDY0" (see FIGS. 6 and 7).

The same process continues in this manner until the value of the address sub-pointer PNT1A exceeds "256". Stored sequentially in RAM4 are x-coordinates "X0,0"-"X0,16" and y-coordinates "Y0,0"-"Y0,16" at the points Q0,0-Q0,16 shown in FIG. 4(A) (see FIG. 9).

(g): When the value of the address sub-pointer PNT1A becomes greater than "256", the following process is effected. "8" is added to the value of the address pointer PNT2, as a consequence of which the pointer value becomes "0008" (see FIG. 7). "1" is added to the value of the address pointer PNT3, whereby the pointer value becomes "0001" (see FIG. 8).

Thus, the processes associated with the segmental curve C1 shown in FIGS. 3 and 4(A) are finished.

(h): Whether or not the value of the address pointer PNT3 comes to "14" is determined. This value "14" corresponds to the number of subdivisions of the segmental curve of FIG. 3. This value is properly selected for each segmental curve.

The present value of the address pointer PNT3 is "0001". The process moves to a calculation routine (c). The same processes as those stated in the items (c) to (g) are performed. Stored sequentially in RAM4 are x-coordinates "X1,0"-"X1,32" and y-coordinates "Y1,0"-"Y1,32" at points Q1,0-Q1,32 shown in FIG. 4(B) (see FIG. 9).

In this manner, the same processes are effected with respect to the segmental curves C1-C14 of FIG. 3 until the value of the address pointer PNT3 becomes "14". When the value of the address pointer PNT3 has come to "14" it is determined that the processes for the segmental curves C1-C14 of FIG. 3 have been finished.

As discussed above, the number of subdivisions of each segmental curve can adequately be selected depending on its curvature. Selecting the optimum number of subdivisions of each segmental curve enables a speed-up of the hardware calculations. In general, if the curvature is small, an accurately-expressed approximate curve can be obtained even with a small number of subdivisions.

A method for obtaining the optimum number of subdivisions of the segmental curve will be explained with reference to FIG. 10.

Figure 10:
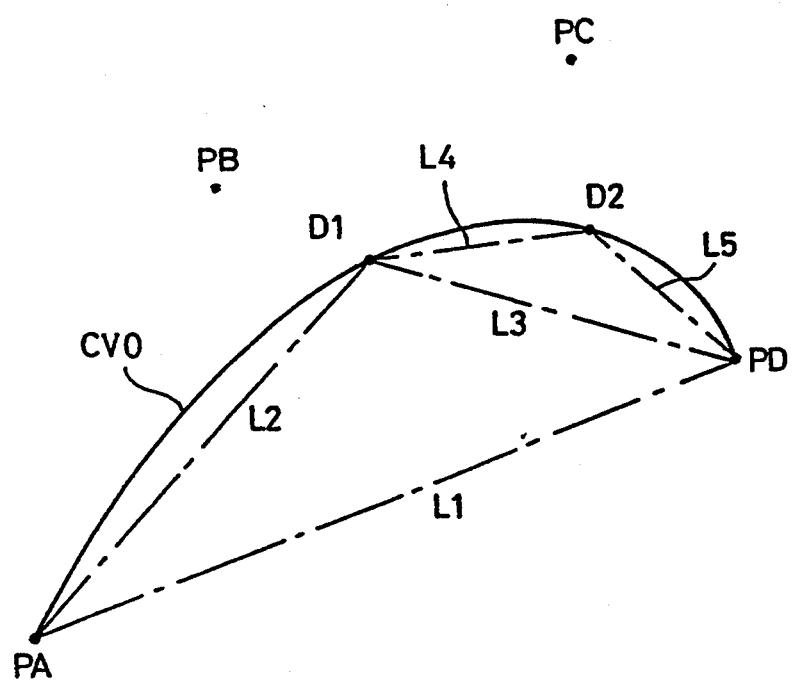
FIG. 10 is a diagram to aid in the explanation of a method for obtaining the number of subdivisions of a segmental curve.

In FIG. 10, the symbols PA and PD indicate anchor points of a segmental curve CV0, while PB and PC are control points thereof. D1 represents a first subdividing point other than the anchor points PA and PD on the segmental curve CV0. To be specific, values of WA−WD are obtained such as $t=\frac{1}{2}$ in the formulae (2a)-(2d). These values are substituted into the formula (1), thereby obtaining the first subdividing point D1. In the segmental curve CV0, the part between the point PD and the first subdividing point D1 is referred to as a first subdivided curve. D2 is a second subdividing point positioned between PD and D1 on the segmental curve CV0. The second subdividing point D2 is a point other than PD and D1. To be specific, values of WA-WD are obtained such as $t=\frac{3}{4}(=\frac{1}{2}+\frac{1}{4})$ in the formulae (2a)-(2d). The point D2 is obtained by substituting these values into the formula (1). Note that in the segmental curve CV0, the part interposed between the point PD and the second subdividing point D2 is referred to as a second subdivided curve. Similarly, a third subdividing point D3 (not illustrated) on the segmental curve CV0 is prescribed on the basis of $t=\frac{7}{8}(=\frac{1}{2}+\frac{1}{4}+\frac{1}{8})$. A fourth subdividing point D4 (not illustrated) on the segmental curve CV0 is prescribed on the basis of $t=15/16(=\frac{1}{2}+\frac{1}{4}+\frac{1}{8}+1/16)$. Thus, subdividing points Dn (not shown) on the segmental curve CV0 are sequentially prescribed. Note that the first to n-th subdividing points D1−Dn can be obtained at a high speed by employing the data table of FIG. 5 in the manner described above. L1 is the length of the line segment connecting the point PA to the point PD with a straight line. L2 is the length of the line segment connecting the point PA to the first subdividing point D1 with a straight line. L3 is the length of the line segment connecting the point PD to the first subdividing point D1 with a straight line. L4 is the length of the line segment connecting the first subdividing point D1 to the second subdividing point D2 with a straight line. L5 is the length of the line segment connecting the point PD to the second subdividing point D2 with a straight line.

Operations for obtaining the number of subdivisions will herein after be described with reference to FIG. 10.

After obtaining the first subdividing point D1, the segment lengths L1, L2, and L3 are obtained, respectively. Differential data is given by:

$$\Delta L1 = L2 + L3 - L1 \tag{3a}$$

Whether or not the first differential data ΔL1 satisfies the following condition is determined.

$$\Delta L1 < \Delta L0 \tag{3b}$$

where ΔL0 is the predetermined constant. If the first differential data ΔL1 meets the condition of the formula (3b), the subdividing number of the segmental curve CV0 of FIG. 10 is "1". If not, after obtaining the second subdividing point D2, segment lengths L4 and L5 are obtained. Second differential data is then expressed as:

$$\Delta L2 = L4 + L5 - L3 \tag{4a}$$

Whether or not the second differential data L2 satisfies the following condition is determined.

$$\Delta L2 < \Delta L0 \tag{4b}$$

If the second differential data L2 meets the condition of the formula (4b), the subdividing number of the segmental curve CV0 of FIG. 10 becomes "2". If not, the subdivisions are effected in the same way as the above-mentioned. The subdividing points D3, D4, ..., Dn are sequentially obtained. Differential data ΔL3, ΔL4, ... ΔLn are also obtained. Whether or not the n-th differential data ΔLn satisfies the following condition is determined.

$$\Delta Ln < \Delta L0 \tag{5b}$$

If the n-th differential data ΔLn meets the condition of the formula (5b), the subdividing number of the segmental curve CV0 of FIG. 10 is "$2^{n-1}$".

Based on the fourth method discussed above, the respective subdividing points are obtained under the conditions that $t=\frac{1}{2}$, $t=\frac{3}{4}(=\frac{1}{2}+\frac{1}{4})$, $t=\frac{7}{8}(=\frac{1}{2}+\frac{1}{4}+\frac{1}{8})$, $t=15/16(=\frac{1}{2}+\frac{1}{4}+\frac{1}{8}+1/16)$, ... these subdividing points may, however, be obtained under conditions in which, for example, $t=\frac{1}{2}$, $t=\frac{1}{4}(=\frac{1}{2}-\frac{1}{4})$, $t=\frac{3}{8}(=\frac{1}{2}-\frac{1}{4}+\frac{1}{8})$, $t=5/16(=\frac{1}{2}-\frac{1}{4}+\frac{1}{8}-1/16)$, ... In short, when obtaining the k-th subdividing point, "$\frac{1}{2}^n$" may be added to or subtracted from the value of "t" at the (k-1) th subdividing point.

In accordance with this invention, the curve is sequentially subdivided into two subdivided curves. The points of both ends of one subdivided curve are connected to the point other than these two points with straight lines. The difference between the total segment length of those straight lines and the length of the line segment when connecting the points of both ends thereof is obtained. The number of subdivisions of the curve is obtained on the basis of the number of subdividing operations until the foregoing difference becomes smaller than the predetermined value. The curve is thus approximately expressed. Therefore, the optimum number of subdivisions is obtained in accordance with the curve to be expressed. The time necessary for generating the outline font can be reduced.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. An apparatus for constructing a second curve that is an approximation of a first curve, comprising a computer having a program memory, wherein said program memory is connected to control said computer to produce signals corresponding the coordinates of a plurality of subdivisions of said first curve and to generate signals corresponding to lines interconnecting adjacent subdividing points with straight lines, the improvement wherein said program memory is connected to said computer to control said computer to generate a sequence of signals corresponding to coordinates of first and second subdivided curve sections of said first curve; said program memory having means to control said computer in response to said sequence of signals, to determine the difference between the total length of a line segment when respectively connecting points at both ends of said first subdivided curve section to a point other than said points of both ends of said first subdivided curve section with straight line segments and the length of the line segment when connecting said points of both ends thereof with a straight line; said program memory further comprising means responsive to said determination of said difference to control said computer to determine the number of subdivisions of said first curve on the basis of the number of subdividing operations until said difference becomes smaller than a predetermined value, said program memory further comprising means responsive to the determination of said number by said computer for controlling said computer to produce output signals corresponding to coordinates of said number of subdivisions of said first curve, said apparatus further comprising means responsive to said output signals for constructing said approximate curve by producing signals corresponding to straight lines joining points corresponding to the ends of said determined number of subdivisions.

2. An apparatus for constructing a second curve that is an approximation of a first curve, the first curve having two anchor points and at least one control point, comprising a computer having a program memory means, said program memory means being connected to said computer to control said computer to produce signals corresponding the coordinates of a plurality of subdivisions of said first curve and to generate signals corresponding to lines interconnecting adjacent subdividing points with straight lines, said program memory means comprising means for controlling said computer to generate a sequence of signals corresponding to coordinate of first and second subdivided curve sections of said first curve; said program memory means comprising first means responsive to generation of said sequence of signals by said computer to control said computer to determine the difference between the total length of a line segment when respectively connecting points at both ends of said first subdivided curve section to a point other than said points of both ends of said first subdivided curve section with straight line segments and the length of the line segment when connecting said points of both ends thereof with a straight line; said program memory means further comprising second means responsive to said determination of said difference by said computer to control said computer to determine the number of subdivisions of said first curve on the basis of the number of subdividing operations until said difference becomes smaller than a predetermined value, said program memory means further comprising third means responsive to the determination by said computer of said number for controlling said computer to produce output signals corresponding to coordinates of said number of subdivisions of said first curve, and further comprising means responsive to said output signals for constructing said approximate curve by producing signals corresponding to straight lines joining points corresponding to the ends of said determined number of subdivisions.

3. An apparatus for constructing a second curve that is an approximation of a first curve, comprising:

a computer having a program memory, first, second, third and fourth random access memories coupled to said computer, said first memory having stored therein predetermined values of WA, WB, WC and WD that are cubic functions of a variable t, defining said first curve, for a sequence of a plurality of equally spaced values of t, wherein $0 \leq t \leq 1$, said second memory having stored therein, coordinates of anchor points PA and PD and control points PB and PC of a plurality of segments of said first curve, said third memory having stored therein a predetermined separate step number n for each of said segments, wherein n is different for at least some of said segments, said program memory comprising means for calculating, for each segment, coordinates thereof in accordance with the relationship:

$$Q = WA \cdot PA + WB \cdot PB + WC \cdot PC + WD \cdot PC$$

employing only nth stored values of said first memory and nth coordinates stored in said first and second memories, respectively, and means for storing said calculated coordinates in said fourth memory, said calculated coordinates comprising said adjacent determined coordinate points.

* * * * *